United States Patent
Maxwell et al.

(10) Patent No.: US 9,504,043 B2
(45) Date of Patent: Nov. 22, 2016

(54) PROVIDING A DATA FUNCTION IN AN ACCESS GATEWAY NODE

(71) Applicant: Apple Inc., Cupertino, CA (US)

(72) Inventors: Stewart H. Maxwell, Dallas, TX (US); Wesley R. Erhart, Sr., McKinney, TX (US); Srinivas Eswara, Garland, TX (US); Anthony D. Bennett, Plano, TX (US); Eric C. Corum, Georgetown, TX (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 14/502,579

(22) Filed: Sep. 30, 2014

(65) Prior Publication Data

US 2015/0055595 A1 Feb. 26, 2015

Related U.S. Application Data

(63) Continuation of application No. 12/839,724, filed on Jul. 20, 2010, now Pat. No. 9,019,891, which is a continuation of application No. 11/448,244, filed on Jun. 7, 2006, now Pat. No. 7,869,393.

(60) Provisional application No. 60/687,989, filed on Jun. 7, 2005.

(51) Int. Cl.
| | |
|---|---|
| *H04W 72/04* | (2009.01) |
| *H04W 8/08* | (2009.01) |
| *H04W 28/08* | (2009.01) |
| *H04W 88/16* | (2009.01) |
| *H04W 76/02* | (2009.01) |

(52) U.S. Cl.
CPC ............ *H04W 72/048* (2013.01); *H04W 8/08* (2013.01); *H04W 28/085* (2013.01); *H04W 72/0413* (2013.01); *H04W 72/0433* (2013.01); *H04W 76/02* (2013.01); *H04W 76/022* (2013.01); *H04W 88/16* (2013.01)

(58) Field of Classification Search
CPC . H04W 72/048; H04W 8/08; H04W 28/085; H04W 72/0413; H04W 72/0433
USPC .................................................. 370/328, 329
See application file for complete search history.

(56) References Cited

U.S. PATENT DOCUMENTS

| | | | | |
|---|---|---|---|---|
| 2002/0159420 | A1* | 10/2002 | Naqvi | H04W 8/08 370/338 |
| 2003/0021256 | A1* | 1/2003 | Lee | H04L 12/2856 370/342 |
| 2003/0058874 | A1 | 3/2003 | Sahaya et al. | |
| 2003/0187926 | A1 | 10/2003 | Karjanlahti | |
| 2004/0053607 | A1 | 3/2004 | Ronneke | |
| 2007/0213057 | A1* | 9/2007 | Shaheen | H04W 76/041 455/436 |

FOREIGN PATENT DOCUMENTS

DE EP1182894 * 2/2002 ............ H04Q 7/22

* cited by examiner

*Primary Examiner* — Ronald B Abelson
(74) *Attorney, Agent, or Firm* — Meyertons, Hood, Kivlin, Kowert & Goetzel, P.C.

(57) ABSTRACT

An access gateway node couples a control node to an external data network, where the control node and access gateway node are for use in a wireless communications network. The access gateway node comprises a data function to route packets containing traffic data between the control node and the external data network. An interface to the control node enables exchange of control messages between the data function and a control function in the control node.

15 Claims, 7 Drawing Sheets

PROVIDING A DATA FUNCTION IN AN ACCESS GATEWAY NODE

CROSS-REFERENCE TO RELATED APPLICATION

This application is a continuation of U.S. Ser. No. 12/839,724, filed Jul. 20, 2010, entitled "Providing a Data Function in an Access Gateway Node", which is a continuation of U.S. Ser No. 11/448,244, filed Jun. 7, 2006, which claims the benefit under 35 U.S.C. §119(e) of U.S. Provisional Application Ser. No. 60/687,989, entitled "Direct Tunnel with Resource Optimization for SGSN & GGSN," filed Jun. 7, 2005, all of which are hereby incorporated by reference.

TECHNICAL FIELD

The invention relates generally to providing a data function in an access gateway node.

BACKGROUND

Mobile or wireless communications networks are capable of carrying both circuit-switched and packet-switched traffic (e.g., voice traffic, data traffic, etc.) between mobile stations and other endpoints, which can be another mobile station or an endpoint connected to a network such as a public-switched telephone network (PSTN) or a packet data network (e.g., local area networks, the Internet, and so forth). Examples of wireless communications networks that support communication of packet-switched traffic include those that operate according to the GSM (Global System for Mobile) or UMTS (Universal Mobile Telecommunications System) standards, as defined by the Third Generation Partnership Project (3GPP).

Current GSM/UMTS networks include a GPRS (General Packet Radio Services) core network for providing packet services, such as Internet Protocol (IP) packet services. The core network also provides support for additional tasks such as billing and lawful interception (interception of communications by law enforcement entities). The GPRS core network includes a Serving GPRS Support Node (SGSN) and a Gateway GPRS Support Node (GGSN). The GGSN is a gateway between the GPRS core network and an external packet data network. In the uplink direction, the GGSN detunnels subscriber data traffic received from the SGSN and sends out external data packets (such as IP packets) over the external data network. In the downlink direction, the GGSN receives IP packets from the external data network and tunnels subscriber data traffic to the SGSN. The SGSN performs various tasks, including mobility management, session management, billing, and so forth.

Conventionally, subscriber data traffic passes from a mobile station (user equipment) through both the data plane of the SGSN and the data plane of the GGSN on its way to an external data network. As a result, the SGSN data plane can be a bottleneck for subscriber data traffic if insufficient resources (hardware and software) are allocated to the SGSN data plane. Thus, the data plane of the SGSN is typically engineered with sufficient resources to handle the sum of all possible subscriber data traffic from radio network resources connected to that particular SGSN. As a result, the data plane resources are usually not utilized at full capacity most of the time, which may result in inefficient use of resources during low traffic time periods.

SUMMARY

In general, a data function is provided in an access gateway node (e.g., a GGSN) of a wireless core network, where the data function is controlled by a control function in a separate control node (e.g., an SGSN).

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
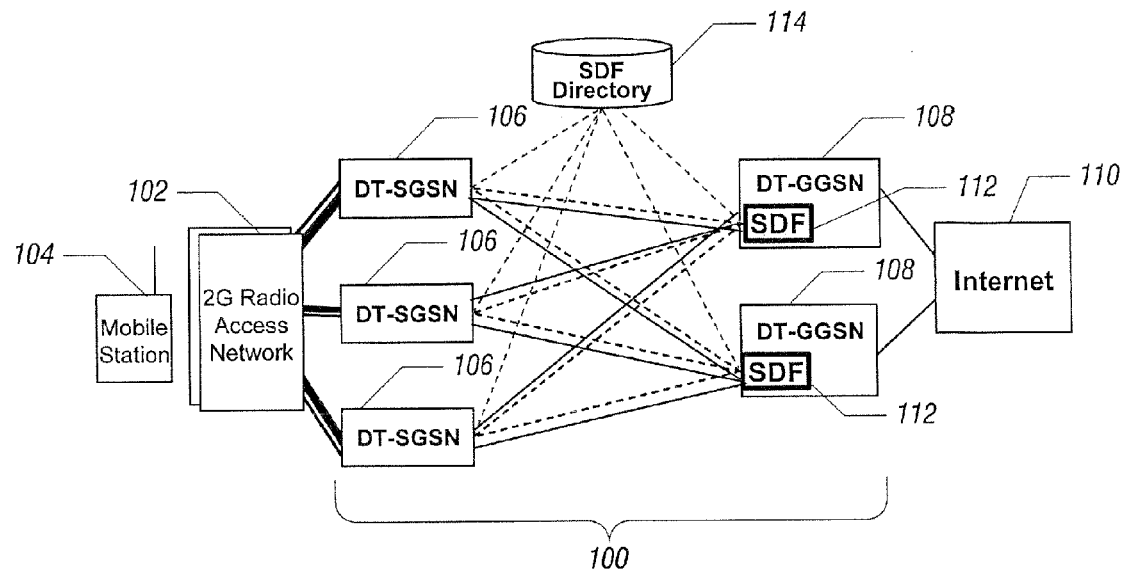
FIGS. 1 and 2 illustrate architectures of wireless communications networks, according to some embodiments.

FIG. 1 shows an example arrangement of a wireless communications network, according to some embodiments. The wireless communications network depicted in FIG. 1 is a GSM (Global System for Mobile) or UMTS (Universal Mobile Telecommunications System) wireless communications network. The GSM/UMTS wireless communications network includes a GPRS (General Packet Radio Service) core network 100 that includes a 2G (Second Generation) radio access network 102 for communicating wirelessly with mobile stations 104. The core network 100 also includes Serving GPRS Support Nodes (SGSNs) 106 and Gateway GPRS Support Nodes (GGSNs) 108. Each SGSN 106 is coupled between a radio access network 102 and a GGSN 108.

The tasks performed by the SGSN include mobility management, session management, billing, and so forth. Each GGSN 108 is effectively a gateway between the core network 100 and an external data network 110, such as the Internet or some other type of network. The external data network 110 can be a packet data network that performs packet-switched communications, such as Internet Protocol (IP) communications. One version of IP is described in Internet Engineering Task Force (IETF) Request for Comments (RFC) 791, entitled "Internet Protocol," dated September 1981; and another version of IP is described in RFC 2460, entitled "Internet Protocol, Version 6, IPv6 Specification," dated December 1998.

Conventionally, each SGSN and GGSN would include a respective user data plane for routing subscriber data traffic. Also, each SGSN and GGSN would also include a respective control plane. The data plane of a conventional SGSN can be considered to include a subscriber data function (SDF) that performs data packet routing and transfer tasks, with the SDF forwarding packets from an access network (such as the radio access network 102) to a GGSN in the uplink direction, and from the GGSN to the access network in the downlink direction. The control plane of a conventional SGSN can be considered to include a subscriber control function (SCF) that performs mobility management and subscriber management, such as those described in 3GPP TS 23.060. The SCF controls operations of the SDF in a conventional SGSN. The term "function" used in the context of a subscriber data function or subscriber control function refers to hardware and/or software of the corresponding data plane or control plane.

Figure 3:
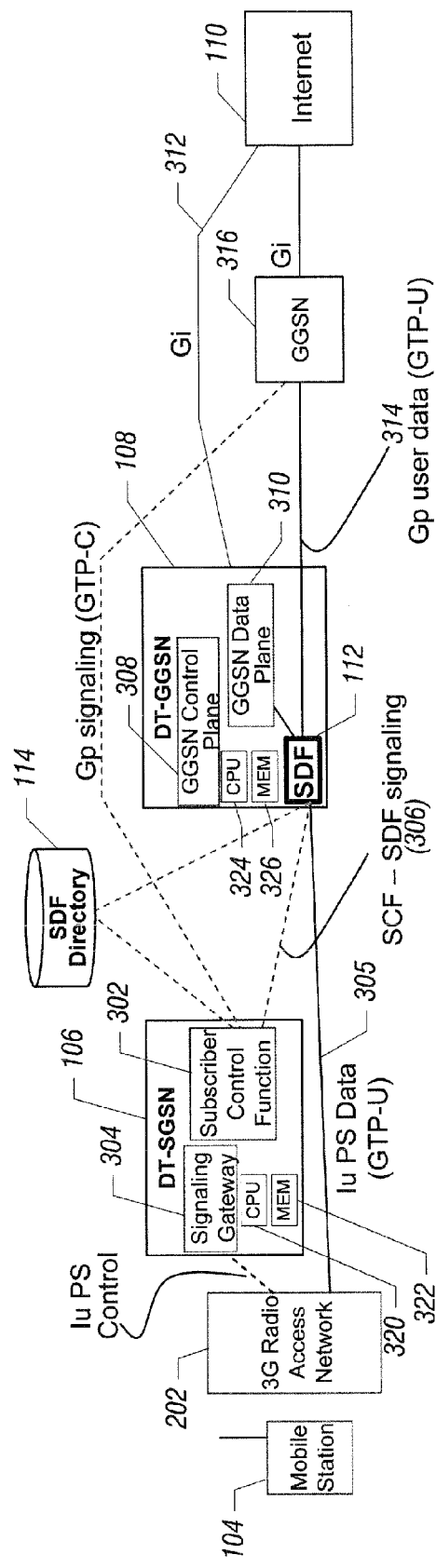
FIG. 3 is a block diagram of a wireless communications network including a Serving GPRS Support Node (SGSN) and a Gateway GPRS Support Node (GGSN) configured according to some embodiments for use with a 3G (Third Generation) radio access network.
Figure 4:
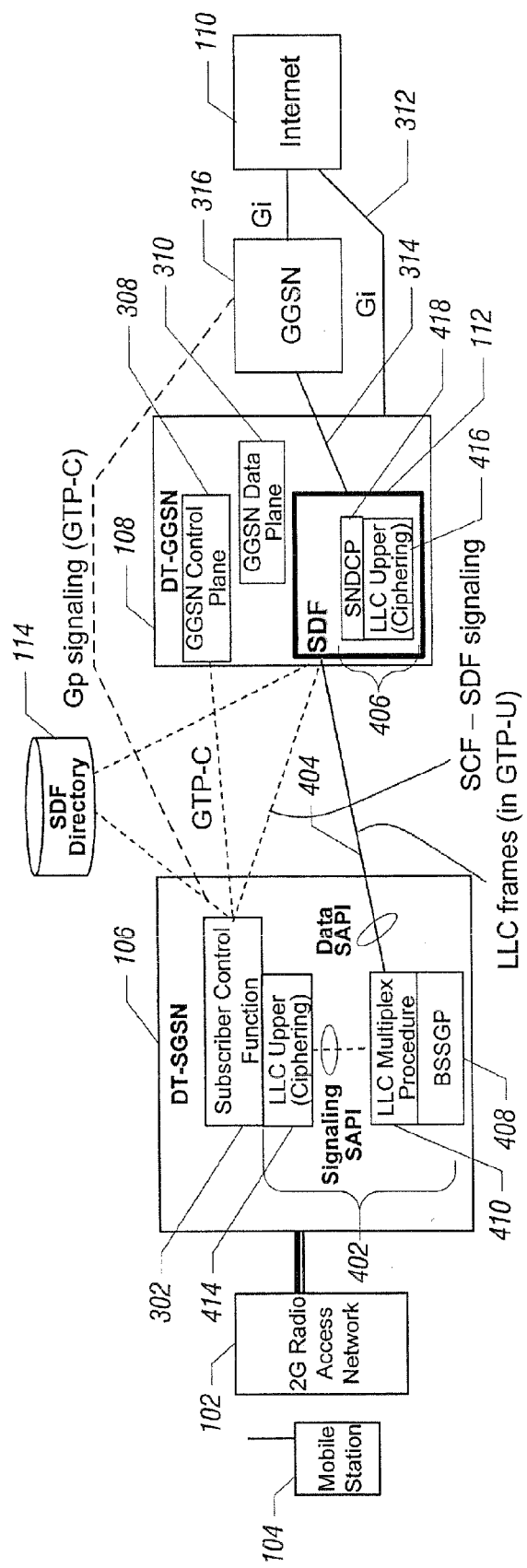
FIG. 4 is a block diagram of a wireless communications network including an SGSN and GGSN configured according to some embodiments for use with a 2G (Second Generation) radio access network.

In accordance with some embodiments, instead of providing both the SCF and SDF of the SGSN in the SGSN, the SCF and SDF are separated such that the SCF resides in the SGSN and the SDF resides in the GGSN. SDFs are identified by reference numeral 112 in FIG. 1. SCFs are not depicted in FIG. 1 but are depicted in FIGS. 3 and 4, described below. By locating the SGSN's SDF at the GGSN instead of the SGSN, various benefits may be provided. For example, the busy hour capacity requirement for the entire wireless communications network can be used to calculate the data plane resources (hardware and software) that should be allocated to the wireless communications network. The data plane resources can then be distributed across all the GGSNs in the network. This is contrasted with conventional arrangements in which the SGSN data plane resources completely reside in the SGSN, in which case the SGSN's data plane resources are typically engineered with the capacity to handle the sum of all possible subscriber traffic from the radio network resources connected to that SGSN. In many cases, the resources of the SGSN's data plane are not used at full capacity most of the time.

By distributing SGSN SDFs across the GGSNs 108 of the wireless communications network rather than in the SGSNs, more efficient usage of the SDF components can be accomplished. As depicted in FIG. 1, each of the SGSNs 106 is coupled to all SDFs 112 in respective GGSNs 108. The dashed lines indicate control links (over which control messages are communicated), while the solid lines between the SGSNs 106 and SDFs 112 represent traffic links over which subscriber data traffic is communicated. Although FIG. 1 shows all SGSNs being connected to all SDFs in corresponding GGSNs, it is noted that different SGSNs can be connected to different groups of SDFs in other implementations.

The SGSNs 106 and GGSNs 108 are referred to as direct-tunnel SGSNs (DT-SGSNs) and direct-tunnel GGSNs (DT-GGSNs). The term "direct-tunnel" refers to the arrangement according to some embodiments where an SGSN SDF is moved out of the SGSN and into the GGSN. In the ensuing discussion, DT-SGSNs and DT-GGSNs are simply referred to as SGSNs and GGSNs. In some cases, reference is also made to standard or normal SGSNs or GGSNs—a standard or normal SGSN or GGSN is one where the SGSN's SDF remains in the standard or normal SGSN and is not deployed in the standard or normal GGSN.

The arrangement of FIG. 1 provides a many-to-many relationship between the SGSNs 106 and SDFs in corresponding GGSNs 108. This many-to-many relationship allows balancing of the traffic load across the GGSNs 108 in the wireless communications network. Load balancing can be performed according to an algorithm described below. In accordance with some embodiments, the SCF in the SGSN continues to control a corresponding SDF in the GGSN. A benefit offered by providing the SCF in the SGSN is that the manner in which billing, lawful interception, and other SGSN tasks are performed do not have to be changed. Also, by providing the SCF in the SGSN, GGSNs 108 can be used in roaming scenarios. The GGSN can appear to be an SGSN to another GGSN outside the wireless communications network, which is used to provide service to mobile stations from other networks that roam into a network that deploys SDFs in GGSNs.

As noted above, SGSNs and GGSNs are employed in GSM/UMTS wireless communications network. Techniques according to some embodiments can be applied to other wireless communications networks. More generally, a GGSN can be considered a type of access gateway node, which is provided at the edge of a wireless communications network for routing data between a mobile station in the wireless communications network and external network devices coupled to an external data network. An SGSN can be considered a type of control node in the wireless communications network to provide various control tasks, such as mobility management, billing, and so forth.

Another node depicted in FIG. 1 is an SDF directory node 114 that communicates with the SGSNs 106 and SDFs 112. The SDF directory node 114 is used by an SGSN 106 to find SDFs in the wireless communications network. Although only one SDF directory node 114 is depicted in FIG. 1, it is noted that multiple SDF directory nodes can be used in the wireless communications network. Generally, the SDF directory node 114 contains a database of information pertaining to SDFs that are implemented in GGSNs. The database correlates GGSN identifiers to respective SDF addresses (note that each GGSN can include one or more SDFs). The database is accessible by the SGSNs for the purpose of selecting an SDF during session setup.

Figure 2:
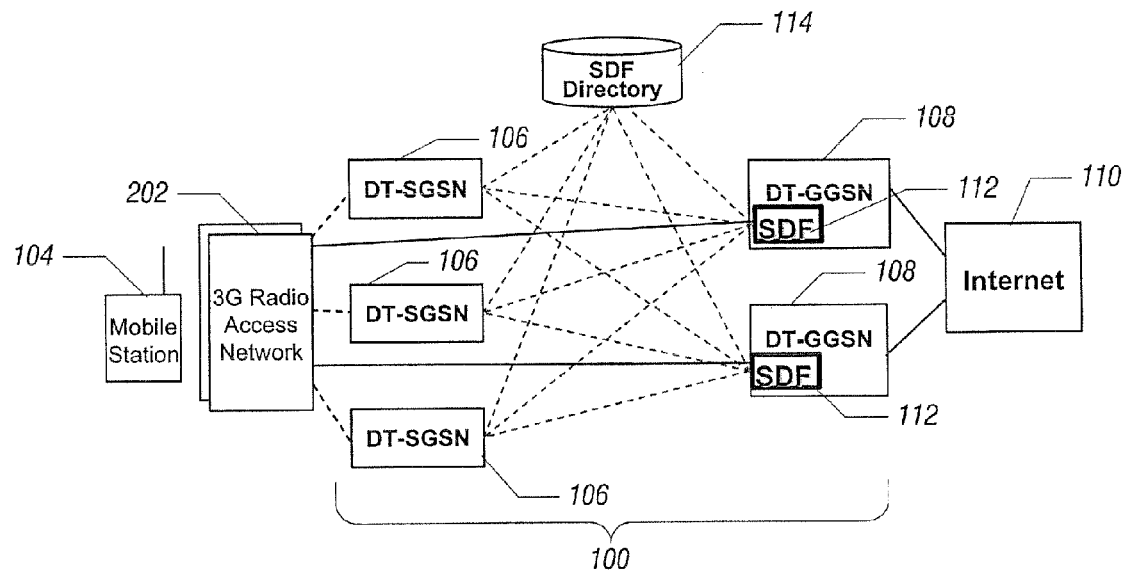

FIG. 1 depicts a scenario in which packet data is communicated between a mobile station 104 and the core network 100 through a 2G radio access network 102. FIG. 2, on the other hand, depicts packet communications through a 3G radio access network 202. Generally, a 2G radio access network provides lower bandwidth packet communications than 3G networks. Although depicted separately in FIGS. 1 and 2, it is noted that a single wireless communications network can include both 2G radio access networks and 3G radio access networks. The main difference between the 2G and 3G scenarios, in the context of some embodiments of the present invention, is that data paths for subscriber traffic are established directly from a 3G radio access network 202 to respective SDF 112 in the GGSNs 108, whereas for the 2G scenario, subscriber traffic passes through layers of a protocol stack in the SGSN 106 to a corresponding SDF 112.

FIG. 3 shows the 3G arrangement in greater detail. As depicted in FIG. 3, the SGSN 106 includes an SCF 302 that performs control tasks with respect to the SDF 112 in the GGSN 108. The SGSN 106 also includes a signaling gateway 304 for receiving IuPS control messages from the 3G radio access network 202. IuPS refers to the interface between a 3G radio access network and the GPRS core network 100. IuPS allows control and traffic messages to be communicated between the 3G radio access network 202 and the GPRS core network. Although reference is made to the IuPS interface according to some implementations, it is noted that other interfaces can be used in other implementations.

In accordance with some embodiments, the IuPS control portion of the IuPS interface is provided between the 3G radio access network 202 and the SGSN 106, while the IuPS data portion (305) is provided between the 3G radio access network 202 and the SDF 112 in the GGSN 108. In other words, a direct data link is established from the 3G radio access network 202 to the corresponding SDF 112. This is contrasted to the conventional arrangement in which the data link is provided solely from the 3G radio access network 202 to an SDF in the SGSN.

As depicted in FIG. 3, the IuPS subscriber traffic is provided in a GTP-U tunnel between the 3G radio access network 202 and the SDF 112. GTP stands for GPRS Tunneling Protocol, with a version described by 3GPP TS 29.060. GTP is separated into GTP-C and GTP-U, where GTP-C is used within the GPRS core network for signaling between SGSNs and GGSNs. On the other hand, GTP-U is used for carrying user data within the GPRS core network and between the radio access network and the core network. User data can be transported in IP packets through a GTP-U tunnel.

As further depicted in FIG. 3, an SCF-SDF signaling link 306 is provided between the SCF 302 and the SDF 112. The SCF-SDF signaling link carries control messages to allow the SCF 302 to control the SDF 112. Also, the SCF 302 is operable to access the SDF directory 114 for the purpose of retrieving lists of SDFs, and the SDF 112 is able to communicate with the SDF directory 114 when the SDF registers or deregisters. Each of the SCF and SDF includes an interface to the SCF-SDF signaling link 306.

The GGSN 108 also includes a GGSN control plane 308 and a GGSN data plane 310. The GGSN control plane 308 and data plane 310 are unmodified from conventional GGSN control and data planes. In the uplink direction, subscriber data traffic from the radio access network 202 is communicated to the SDF over link 305 (through a GTP-U tunnel), with the SDF 112 passing the subscriber data traffic to the GGSN data plane 310. The GGSN data plane 310 then detunnels the subscriber data traffic from the SDF 112 to transmit data packets (e.g., IP packets) containing the subscriber data traffic to the external data network 110 over a Gi interface 312. The Gi interface is the interface (or link) of a GGSN to the external data network. In the downlink direction, subscriber data traffic from the external data network 110 is routed over the Gi interface 312 to the GGSN data plane 310, which in turn routes the subscriber data traffic through the SDF 112 back to the radio access network 202 over the link 305. The radio access network 202 routes the subscriber data traffic to the mobile station 104. The above scenario describes a scenario in which the mobile station 104 is in its home wireless communications network.

In a roaming scenario, where the mobile station 104 is visiting from another wireless communications network, the SDF 112 provides a Gp interface 314 to a GGSN 316 in the home network of the roaming mobile station 104. The Gp interface is the interface (described in 3GPP TS 23.060 and 29.060) between an SGSN and a GGSN in two different wireless communications networks. Note that the GGSN 108 does not include the SGSN SCF—as a result, a Gp signaling link has to be established between the SCF 302 in the SGSN 106 and the GGSN 316. This Gp signaling link is provided by GTP-C. Alternatively, the signaling messages between the SCF 302 and the GGSN 316 can be passed through the GGSN 108.

The GGSN 316 can either be a normal GGSN (a GGSN without an SGSN SDF deployed in the GGSN) or a DT-GGSN. Subscriber data traffic is carried in a GTP-U tunnel between the SDF 112 and the GGSN 316. From the perspective of the GGSN 316, the SDF 112 in the GGSN 108 appears to be an SDF 112 located in an SGSN.

The arrangement depicted in FIG. 3 is also useful in a non-roaming context within a single wireless communications network where two types of GGSNs are provided, with one type being the DT-GGSN 108 and the other type being a normal GGSN 316. The DT-GGSN 108 can provide the SDF between the radio access network 202 and the normal GGSN 316 (the DT-GGSN 108 also appears as an SGSN to the GGSN 316). In this scenario, the interface between the DT-GGSN 108 and the GGSN 316 is a Gn interface (also described in TS 23.060 and 29.060), where the Gn interface is the interface (or link) between an SGSN and a GGSN within the same wireless communications network.

The ability to appear as an SGSN to another GGSN allows a DT-GGSN to enable support for (1) roaming mobile stations that have to access an external data network through a GGSN in the mobile stations' home network, and (2) a wireless communications network that has different types of GGSNs (DT-GGSNs and normal GGSNs).

Note also that a DT-GGSN has the conventional capabilities specified by 3GPP of a normal GGSN so that the DT-GGSN can inter-operate with a normal SGSN according to the 3GPP standards.

Each of the SGSN 106 and GGSN 108 includes a central processing unit (CPU) 320 or 324, respectively (or plural CPUs). The CPU(s) is (are) coupled to respective memory 322, 326. Software of the SCF 302 in the SGSN is executable on the CPU(s) 320, while software of the SDF 112 in the GGSN is executable on the CPU(s) 324. Although not shown, the SDF directory 114 can also include one or more CPUs, with software in the SDF directory 114 executable on the one or more CPUs. The SDF directory 114 can be implemented as a node that includes both software and hardware, or the SDF directory 114 can be implemented in a node that performs other tasks, where such node includes one or more CPUs.

As noted above, FIG. 3 illustrates the arrangement for enabling the implementation of the SDF 112 in the GGSN 108 when a 3G radio access network 202 is used for communicating subscriber data traffic between the mobile station 104 and the external network 110. FIG. 4, on the other hand, illustrates the arrangement for enabling implementation of the SDF 112 in the GGSN 108 when a 2G radio access network 102 is involved in communications between the mobile station 104 and the external data network 110. Elements in FIG. 4 that are the same as elements in FIG. 3 share the same reference numerals—these common elements are not discussed further with respect to FIG. 4.

As is the case with the FIG. 3 arrangement, the SGSN 106 of FIG. 4 also includes an SCF 302 for controlling the SDF 112 in the GGSN 108. However, for 2G communications, subscriber data traffic passes from the radio access network 102 through an SGSN protocol stack to the GGSN 108 (unlike the case in the 3G scenario where the data path is established directly between the 3G radio access network 202 and the GGSN 108 without passing through the SGSN 106). In one embodiment, this SGSN protocol stack is an SNDCP/LLC/BSSGP (Subnetwork Dependent Convergence Protocol/Logical Link Control/Base Station Subsystem GPRS Protocol) protocol stack. In other embodiments, other types of SGSN protocol stacks can be employed.

According to some embodiments, the SGSN protocol stack that is normally deployed within the SGSN is divided into two parts, where one part (402) is deployed in the SGSN 106 and another part (406) is deployed in the SDF 112 in the GGSN 108.

A BSSGP layer 408 in the protocol stack 402, 406, which is deployed in the SGSN 106, performs one or more of the following tasks: provide radio-related QoS (Quality of Service) and routing information for transmitting subscriber data traffic between the radio access network 102 and the SGSN 106. BSSGP is described in 3GPP TS 48.018. An LLC layer in the protocol stack 402, 406 is divided into two parts, including an LLC upper part and an LLC lower part. The LLC lower part includes an LLC multiplex procedure 410 that is provided in the SGSN 106. The LLC multiplex procedure 410 routes LLC frames to either the SCF 302 or the SDF 112 based on a service access point identifier (SAPI) contained in the LLC frame. Generally, control-related LLC frames (that carry control messages) are routed to the SCF 302 over a signaling link whereas user data-related LLC frames (that carry subscriber data traffic) are routed over a data link 404 to the SDF 112.

In accordance with some embodiments, LLC frames are carried in a GTP-U tunnel between the SGSN and GGSN. An LLC frame is carried in a payload of a GTP-U data unit, where the GTP-U data unit also includes a GTP header as defined by 3GPP TS 29.060.

The LLC upper part is divided between an LLC upper part 414 that is located in the SGSN 106 and an LLC upper part 416 that is located in the GGSN 108. The LLC upper parts 414 and 416 perform various tasks, including ciphering, flow control, sequence control, error detection and correction, and notification of unrecoverable errors, among other tasks. The LLC upper part 414 is used for processing control-related LLC frames, whereas the LLC upper part 416 is used for processing user data-related LLC frames. LLC frames are packet data units for carrying control and user data through the LLC layer. The LLC layer performs the following example tasks: providing a logical link between the mobile station and the SGSN for end-to-end data exchange, provides user identity protection, provides priority handling of certain packets, provides flow control, provides error detection, and performs ciphering. Additional details of tasks performed by the LLC layer can be found in 3GPP TS 44.064.

In one specific example implementation, the SAPIs associated with GPRS mobility management and short messaging are considered to be SAPIs for control-related LLC frames. The remaining SAPIs are used to identify LLC frames containing subscriber data traffic. Since ciphering is the most intensive task performed by the LLC layer of an SGSN, it is useful to locate the ciphering task for subscriber data traffic in the GGSN rather than in the SGSN.

The SDF 112 in the GGSN 108 also includes an SNDCP layer 418 that is part of the protocol stack 402, 406. The SNDCP layer 418 performs various tasks, such as negotiation of subscriber data compression and IP header compression, and segmentation and reassembly of IP packets. Further details regarding tasks performed by the SNDCP layer 418 can be found in 3GPP TS 44.065.

In an alternative implementation, the LLC Multiplex procedure 410 and BSSGP layer 408 can be provided in the SDF 112 instead of in the SGSN 106. In this alternate implementation, the 2G radio access network 102 will be connected to the protocol stack in the GGSN (rather than the SGSN as depicted in FIG. 4). In this implementation, control frames are routed by the LLC Multiplex procedure from the GGSN back to the SGSN.

Generally, when an SDF 112 first starts up within a GGSN, the SDF 112 registers with the SDF directory 114. Later, when an SGSN seeks to establish a connection, it can retrieve a list of available SDFs from the SDF directory 114. The list of SDFs provided from the SDF directory 114 to the requesting SGSN 106 contains the SDFs that are part of the selection pool. According to some embodiments, the SDFs in the selection pool for the SGSN are those SDFs associated with GGSNs that service a requested access point name (APN) in a request submitted by the requesting mobile station 104. An APN is a label (or domain name) in accordance with DNS (Domain Name Server) naming conventions, that describes or indicates the access point to an external data network. Details of DNS are described in RFC 1035, entitled "Domain Names—Implementation and Specification," dated November 1987.

To perform load balancing, the SGSN is able to select an SDF that is not overloaded. In the ensuing discussion, an SDF that is not overloaded is also referred to as an SDF that is normally loaded. If no SDF of GGSNs servicing the requested APN meets this condition, the SGSN can select a non-overloaded SDF that is resident on another GGSN.

The control protocol (referred to as a Monitor Communication Protocol or MCP in one example implementation) between the SGSN and SDFs includes notification of SDF loading in terms of percentage of maximum number of sessions and remaining committed bit rate. The remaining committed bit rate is the amount of bandwidth remaining once the SDF satisfies its guaranteed bit rate commitments. In accordance with some implementations, an SDF is considered overloaded when its maximum number of sessions is exceeded or its remaining committed bit rate is zero. Every message (including heartbeat messages) sent from the SDF to an SGSN contains this information. Each SGSN stores the current loading of each SDF so that the SGSN can select a non-overloaded SDF during an SDF selection phase.

In accordance with some embodiments, each SGSN 106 can provide billing services as provided by a normal SGSN. When an SGSN 106 establishes a connection with an SDF, the SGSN 106 instructs the selected SDF with the bearer path billing requirements (e.g., triggers based on time or volume of data). When these triggers occur, the SDF sends relevant billing information to the SGSN 106 controlling the connection. The SGSN 106 then bills the user in the same manner as a normal SGSN.

Figure 5:
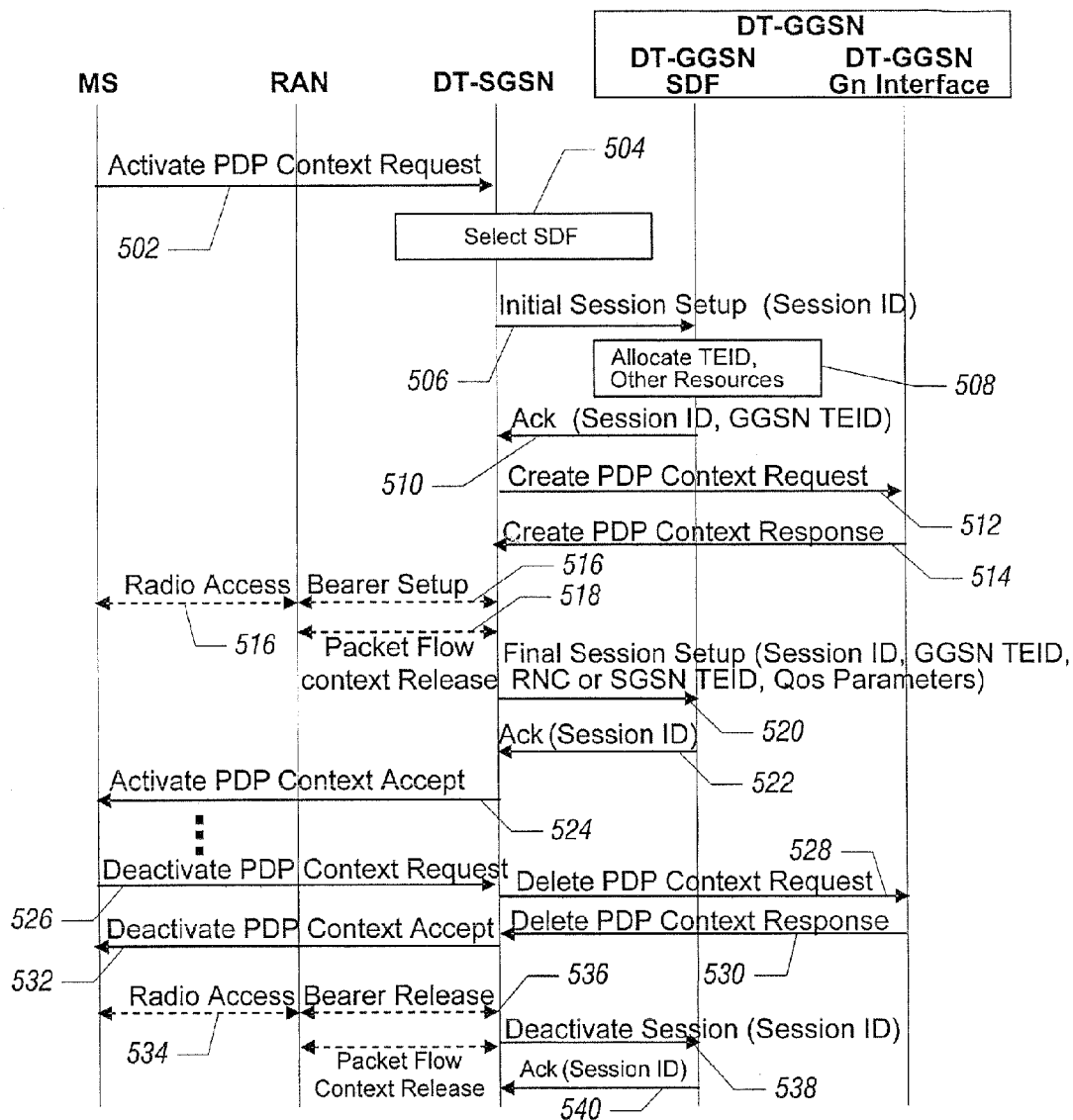
FIG. 5 is a message flow diagram of a process of selecting, by an SGSN, a subscriber data function (SDF) in a GGSN, and establishing a session with the SDF, in accordance with an embodiment.

FIG. 5 illustrates a process for establishing a connection in accordance with some embodiments. The mobile station establishes a connection by sending an Activate PDP (Packet Data Protocol) Context Request message (at 502) to the SGSN through the radio access network. A PDP context is a logical association between a mobile station and an external data network over a wireless access network. The PDP context defines a PDP type, a PDP address, and a QoS profile, among other items. The Activate PDP Context Request message is used for activating a PDP context, such as a primary PDP context. In other embodiments, the mobile station can use other messages for establishing a connection through the wireless core network 100.

In response to the Activate PDP Context Request message, the SGSN selects (at 504) an SDF from among a pool of SDFs (which pool of SDFs was retrieved from the SDF directory 114). The SGSN then sends (at 506) an Initial Session Setup message (containing a session identifier or ID to identify the requested session) to the selected SDF in the GGSN. The Initial Session Setup message is sent to perform initial session setup between the SGSN and the SDF. Although reference is made to the SGSN sending control messages to the SDF, it is noted that it is the SCF in the SGSN that sends the control messages to the corresponding SDF in the GGSN.

In response to the Initial Session Setup message, the SDF allocates (at 508) a TEID (Tunnel Endpoint Identifier) of the GGSN. The TEID is an identifier used with GTP-U to tunnel subscriber data traffic between the GGSN and SGSN or between the GGSN and a 3G radio access network. Two TEIDs (of the two endpoints) are used to define a tunnel—the TEID of the GGSN is one of the two TEIDs. Other resources are also allocated at 508.

Next, the SDF sends (at 510) an acknowledgment (Ack) message to the SGSN that contains the session ID and the TEID (Tunnel Endpoint Identifier) of the GGSN. After receiving the Ack message, the SGSN next sends (at 512) a Create PDP Context Request message (a message used to continue the creation of the requested PDP context) to the Gn interface of the GGSN. The Gn interface is the interface between the SGSN and the GGSN. The GGSN responds (at 514) with a Create PDP Context Response message. Upon receipt of the Create PDP Context Response message, the SGSN proceeds to perform (516) radio access bearer setup (if a 3G radio access network is used) or to perform (at 518) a packet flow context procedure (if a 2G radio access network is used). The procedure performed at 516 or 518 ensures that resources are established in the radio access network for wireless communications with the mobile station for the requested session.

Next, the SGSN sends (at 520) a Final Session Setup message to the SDF, which message contains the session ID, QoS parameters, and the TEID of either the radio network controller (if a 3G radio access network is used) or the TEID of the SGSN (if a 2G radio access network is used). The Final Session Setup message is used to complete the session setup between the SGSN and the SDF. The SDF returns an Ack message (at 522) to the SGSN, which Ack message contains the session ID. In response, the SGSN returns (at 524) an Activate PDP Context Accept message to indicate that the PDP context has been successfully activated.

Later, to deactivate the PDP context, the mobile station sends (at 526) a Deactivate PDP Context Request message to the SGSN, which in response sends (at 528) a Delete PDP Context Request message to the Gn interface of the GGSN. The GGSN then responds (at 530) with a Delete PDP Context Response message to the SGSN. The SGSN in turn sends (at 532) a Deactivate PDP Context Accept message to the mobile station to indicate that the PDP context has been deactivated.

Next, the mobile station performs (at 534) radio access bearer release (if a 3G radio access network is used) or performs (at 536) packet flow context release (if a 3G radio access network is used). The SGSN also sends (at 538) a Deactivate Session message to the SDF, which message contains the session ID, for deactivate the session between the SGSN and the SDF. In response, the SDF sends (at 540) an Ack message to the SGSN.

Although reference is made to a specific message names, such as Initial Session Setup, Ack, Final Session Setup, and Deactivate Session, for control messages between the SCF (in the SGSN) and the SDF (in the GGSN), it is noted that other message names can be used in other implementations.

Figure 6:
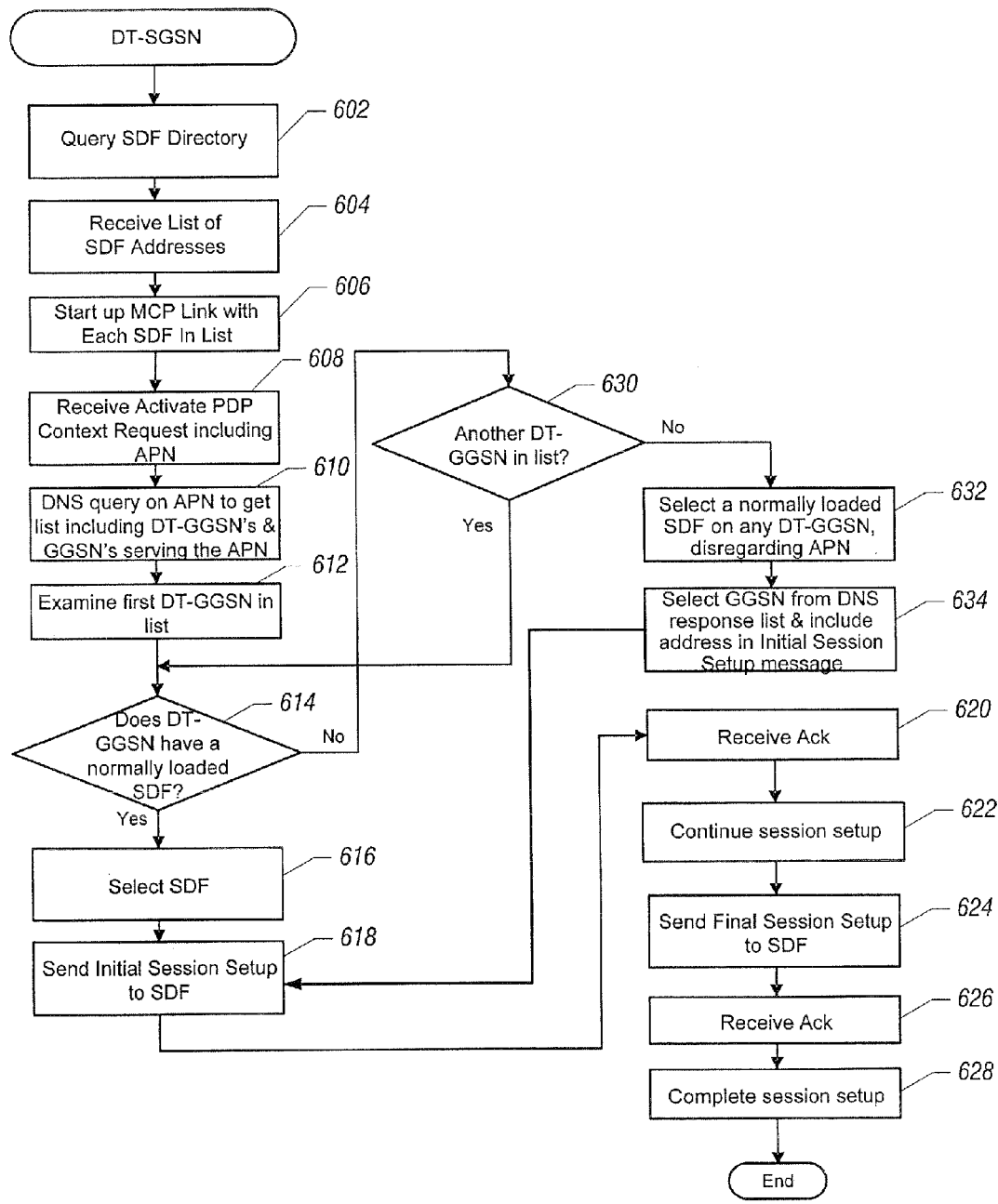
FIG. 6 is a flow diagram of a process performed by an SGSN, according to some embodiments.

FIG. 6 is a flow diagram of a process performed by an SCF in an SGSN. The SGSN sends (at 602) a query to the SDF directory 114 to retrieve a list of SDF addresses indexed by GGSN identifiers (GGSN IDs). This query can be submitted periodically, in response to predefined events, or in response to some other stimulus.

The SGSN next receives (at 604) a list of SDF addresses (indexed according to GGSN IDs) from the SDF directory 114, which list is transmitted by the SDF directory 114 in response to the query. The list of SDF addresses indexed by GGSN IDs is then stored in the SGSN. The SGSN then starts up (at 606) an MCP (Monitor Communication Protocol) link with each of the SDFs in the list. MCP is an example protocol for communications between an SCF and an SDF—other protocols can be used in other implementations.

The MCP provides for heartbeat messages between each pair of an SGSN (SCF) and an SDF. MCP also provides messages to report packet loss, SDF operational status changes, and SDF load status. As indicated above, load status is communicated in each message sent from the SDF to the SGSN (including heartbeat messages) in terms of percentage of maximum number of sessions and remaining committed bit rate. The SDF also reports its state to an SGSN. The SDF can be in a locked state or unlocked state. If the SDF is in a locked state, the SGSN does not select that SDF for new PDP Context. However, if the SDF is in the unlocked state, then that SDF can be used for new PDP Context.

Subsequently, when the SGSN receives (at 608) an Activate PDP Context Request message from a mobile station that includes an APN, the SGSN performs a DNS query (at 610) on the APN to obtain a list of DT-GGSNs and normal GGSNs that serve the APN. The DNS query is sent to a domain name server, which maps the APN to plural IP addresses of corresponding GGSNs that serve the particular APN.

The SGSN examines (at 612) the first DT-GGSN in the list of DT-GGSNs and GGSNs. The SGSN determines (at 614) if this DT-GGSN has a normally loaded SDF (which is an SDF that is not overloaded). Note that the SGSN is continually receiving messages from SDFs regarding their load status. The load status information of the SDFs are maintained by the SGSN so that the SGSN can perform the determination at 614.

If the DT-GGSN does have a normally loaded SDF, then the SGSN selects (at 616) the normally loaded SDF. The SGSN then sends (at 618) an Initial Session Setup message to the SDF (which corresponds to the message sent at 506 in FIG. 5). The SGSN next receives (at 620) an Ack message (corresponding to message 510 in FIG. 5). Further session setup tasks are performed (at 622), which correspond to tasks 516 and 518 in FIG. 5. The SGSN then sends (at 624) a Final Session Setup message to the SDF. Upon receiving (at 626) the Ack message in response to the Final Session Setup message, the session setup between the SGSN and the SDF is complete (628).

If the SGSN determines (at 614) that the first DT-GGSN in the list does not have a normally loaded SDF (in other words, all SDFs in the DT-GGSN are overloaded), the SGSN determines whether there is another DT-GGSN in the list for the APN. If so, this other DT-GGSN is selected, and the determination at 614 and subsequent acts are performed.

However, if there is not another DT-GGSN in the list for the APN, the SGSN selects (at 632) a normally loaded SDF on any DT-GGSN, regardless of the APN received in the Activate PDP Context Request message. Because a DT-GGSN that does not serve the APN is being used in this scenario, the connection has to go back through a normal GGSN that does serve the APN. Such a GGSN would be the GGSN 316 shown in FIG. 3 or 4. This GGSN is selected from the DNS response list (received at 610), which means that the selected GGSN serves the APN of the Activate PDP Context Request message. The address of the GGSN is included in the Initial Session Setup message, and control proceeds to act 618 in FIG. 6.

Figure 7:
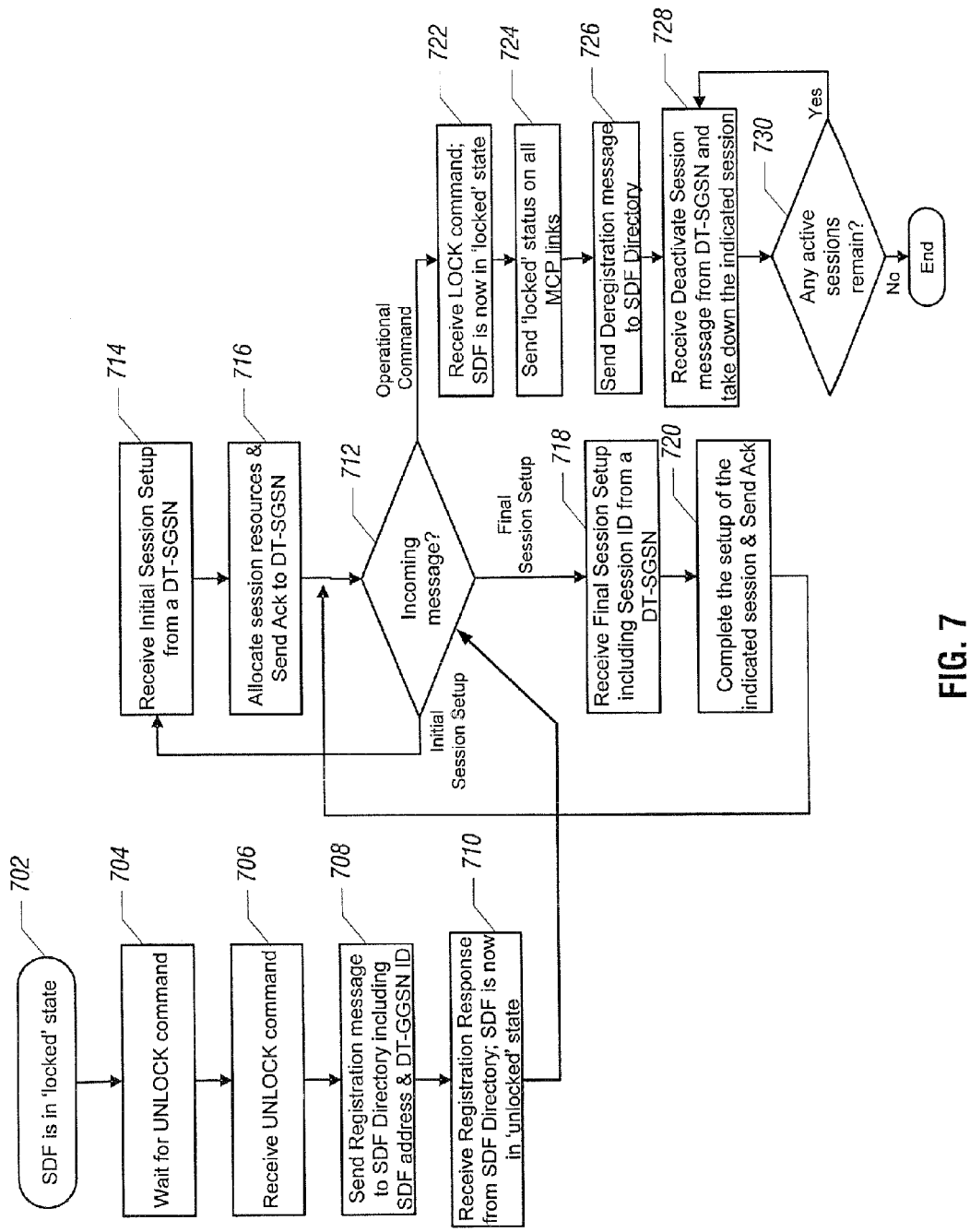
FIG. 7 is a flow diagram of a process performed by an SDF, according to some embodiments.

FIG. 7 illustrates tasks performed by an SDF. Assuming that the SDF is initially in a locked state (702), the SDF waits (at 704) for an UNLOCK command from an operator console (not shown), which is coupled to the GGSN 108. The operator console can be located at the GGSN 108 or located at a remote location with the operator console being able to provide commands to the GGSN 108. In response to receiving (at 706) the UNLOCK command, the SDF sends (at 708) a Registration message to the SDF directory 114, where the Registration message includes the SDF address and the ID of the DT-GGSN that the SDF is associated with. After receiving (at 710) the Registration Response message from the SDF directory, the SDF is now considered to be in the unlocked state.

Next, the SDF checks (at 712) for an incoming message. If the incoming message is the Initial Session Setup message, the SDF receives (at 714) the Initial Session Setup message and allocates (at 716) session resources. Also, the SDF sends an Ack message to the DT-SGSN.

If the incoming message is a Final Session Setup message, the Final Session Setup message including the session ID is received (at 718) from the DT-SGSN. The SDF then completes (at 720) the setup of the indicated session and sends the corresponding Ack message.

If the incoming message is an operational command from the operator console coupled to the GGSN, such as a LOCK command, the SDF receives (at 722) the LOCK command to cause the SDF to be placed in the locked state. The locked status is then sent (at 724) on all MCP links to corresponding DT-SGSNs. Also, the SDF sends (at 726) a Deregistration message to the SDF directory to deregister the SDF in the SDF directory.

If the received operational command is a Deactivate Session message (such as the message sent at 538 in FIG. 5) received from the SCF, the SDF takes down (at 728) the indicated session. If any active session remains, the SDF returns to wait for further Deactivate Session messages from corresponding DT-SGSNs.

Figure 8:
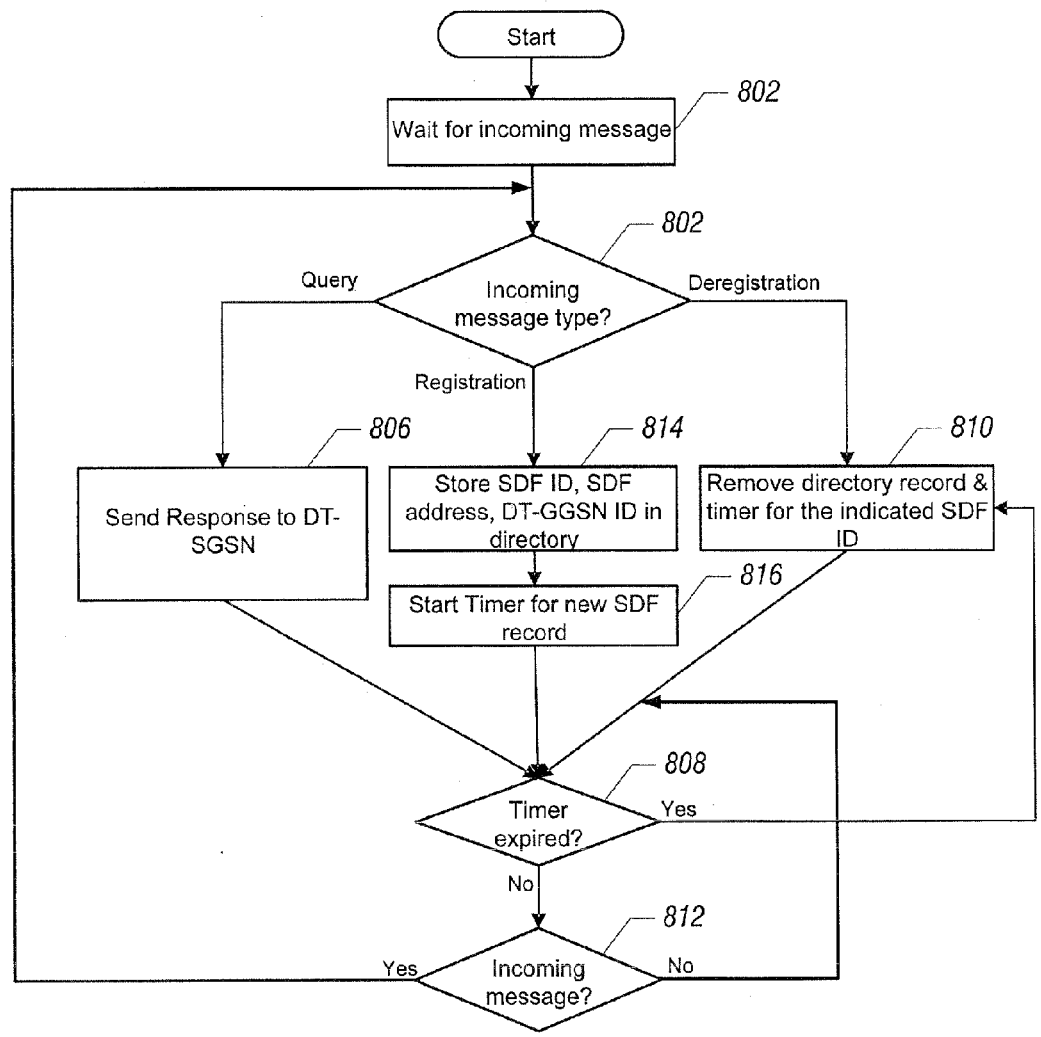
FIG. 8 is a flow diagram of a process performed by an SDF directory coupled to the SGSN and SDF, according to some embodiments.

FIG. 8 shows the flow diagram of tasks performed by the SDF directory 114. The SDF directory waits (at 802) for an incoming message. The SDF then detects (at 804) the incoming message type. If the incoming message is a query, the SDF directory sends (at 806) a response to the requested DT-SGSN, which response includes identifiers and addresses of SDFs that are indexed to DT-GGSN IDs.

In accordance with some embodiments, each SDF in the SDF directory is associated with a timer. If the timer expires (as detected at 808), the corresponding SDF identifier is removed from the directory (along with the timer). If the timer has not expired, the SDF directory waits for the next incoming message (at 812).

A Deregistration message sent by an SDF and received by the SDF directory ("Deregistration" path from the decision diamond 804) also causes the corresponding directory record and timer to be removed (at 810). If the incoming message type is a Registration message ("Registration" path from the decision diamond 804), then the corresponding SDF ID, SDF address, and DT-GGSN ID are stored in a record of the directory. The timer is then started for the new SDF record (at 816).

Instructions of various software (e.g., including software of the SCF, SDF, SDF directory, and so forth) are loaded for execution on corresponding processors. Processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method for use in a wireless communications network, comprising:

receiving, by a particular control node, a message from a mobile station to activate a connection, wherein the mobile station is wirelessly communicating with a radio access network;

in response to the message, the particular control node selecting one or more access gateway nodes that interface the particular control node to an external data network, the selected one or more access gateway nodes comprising at least one data function, wherein the at least one data function is separated from corresponding control functions in the particular control node, and wherein each of the selected one or more access gateway nodes includes a control plane and a data plane, wherein the particular control node determines whether to select only one access gateway node comprising the at least one data function and an interface to the external data network, or whether to select a first access gateway node comprising the at least one data function, and a second access gateway node comprising an interface to the first access gateway node and an interface to the external data network; and the particular control node sending commands to the at least one data function of the selected one or more access gateway nodes, to establish a session between the particular control node and the at least one data function and to establish a data path between the radio access network and the at least one data function, wherein the data path does not pass through the particular control node.

2. The method of claim 1, further comprising:
the particular control node retrieving from a directory a list of access gateway nodes.

3. The method of claim 1, wherein the received message contains an access point name, the method further comprising:
sending a domain name server query on the access point name to retrieve a list of access gateway nodes serving the access point name;
wherein the selecting one or more access gateway nodes comprises selecting one of the access gateway nodes identified in the list.

4. The method of claim 1, wherein the particular control node is configured to perform mobility management and subscriber management.

5. The method of claim 1, wherein the selecting the one or more access gateway nodes is based in part on load balancing.

6. A control node of a wireless communications network, the control node comprising:
a memory; and
a processor coupled to the memory, the processor configured to execute software instructions stored in the memory to cause the control node to:
receive a message from a mobile station to activate a connection, wherein the mobile station is wirelessly communicating with a radio access network;
in response to the message, select one or more access gateway nodes that interface the control node to an external data network, the selected one or more access gateway nodes comprising at least one data function, wherein the at least one data function is separated from corresponding control functions in the control node, and wherein each of the selected one or more access gateway nodes includes a control plane and a data plane, wherein the selecting the one or more access gateway nodes comprises determining whether to select only one access gateway node comprising the at least one data function and an interface to the external data network, or whether to select a first access gateway node comprising the at least one data function, and a second access gateway node comprising an interface to the first access gateway node and an interface to the external data network; and
sending commands to the at least one data function of the selected one or more access gateway nodes, to establish a session between the control node and the at least one data function and to establish a data path between the radio access network and the at least one data function, wherein the data path does not pass through the control node.

7. The control node of claim 6, wherein the processor is further configured to cause the control node to:
retrieve from a directory a list of access gateway nodes.

8. The control node of claim 6, wherein the received message contains an access point name, wherein the processor is further configured to cause the control node to:
send a domain name server query on the access point name to retrieve a list of access gateway nodes serving the access point name;
wherein the selecting one or more access gateway nodes comprises selecting one of the access gateway nodes identified in the list.

9. The control node of claim 6, wherein the processor is further configured to cause the control node to perform mobility management and subscriber management.

10. The control node of claim 6, wherein the selecting the one or more access gateway nodes is based in part on load balancing.

11. A non-transitory computer-readable memory medium storing software instructions executable by a processor of a control node to cause the control node to:
receive a message from a mobile station to activate a connection, wherein the mobile station is wirelessly communicating with a radio access network;
in response to the message, select one or more access gateway nodes that interface the control node to an external data network, the selected one or more access gateway nodes comprising at least one data function, wherein the at least one data function is separated from corresponding control functions in the control node, and wherein each of the selected one or more access gateway nodes includes a control plane and a data plane, wherein the selecting the one or more access gateway nodes comprises determining whether to select only one access gateway node comprising the at least one data function and an interface to the external data network, or whether to select a first access gateway node comprising the at least one data function, and a second access gateway node comprising an interface to the first access gateway node and an interface to the external data network; and
sending commands to the at least one data function of the selected one or more access gateway nodes, to establish a session between the control node and the at least one data function and to establish a data path between the radio access network and the at least one data function, wherein the data path does not pass through the control node.

12. The non-transitory computer-readable memory medium of claim 11, wherein the software instructions are further executable to cause the control node to:
retrieve from a directory a list of access gateway nodes.

13. The non-transitory computer-readable memory medium of claim 11, wherein the received message contains an access point name, wherein the software instructions are further executable to cause the control node to:
send a domain name server query on the access point name to retrieve a list of access gateway nodes serving the access point name;
wherein the selecting one or more access gateway nodes comprises selecting one of the access gateway nodes identified in the list.

14. The non-transitory computer-readable memory medium of claim 11, wherein the software instructions are further executable to cause the control node to perform mobility management and subscriber management.

15. The non-transitory computer-readable memory medium of claim 11, wherein the selecting the one or more access gateway nodes is based in part on load balancing.

* * * * *